UNITED STATES PATENT OFFICE.

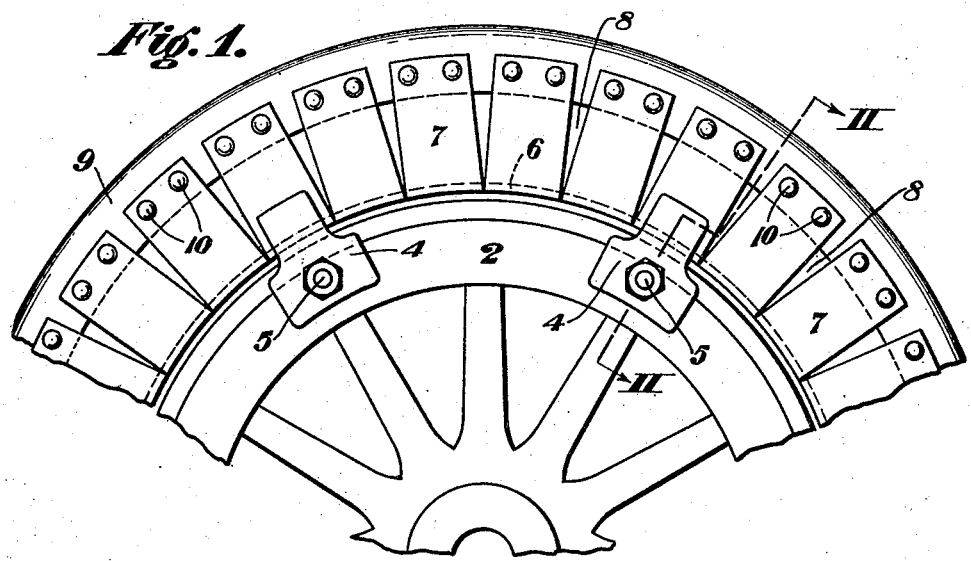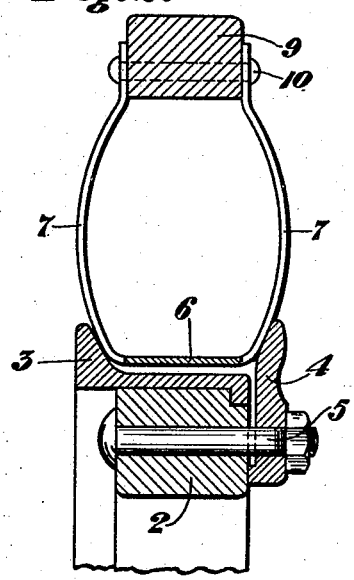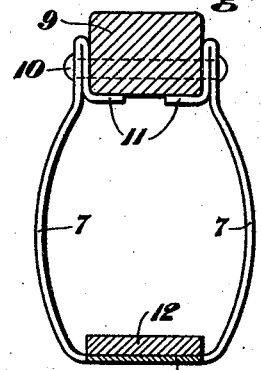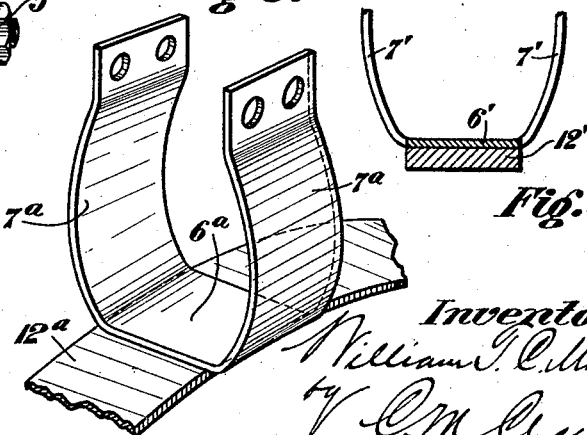

WILLIAM T. C. MORGAN, OF McKEES ROCKS, PENNSYLVANIA.

TIRE.

1,335,452.

Specification of Letters Patent.  Patented Mar. 30, 1920.

Application filed July 9, 1919. Serial No. 309,660.

*To all whom it may concern:*

Be it known that I, WILLIAM T. C. MORGAN, a citizen of the United States, residing at McKees Rocks, in the county of Allegheny and State of Pennsylvania, have invented certain new and useful Improvements in Tires, of which the following is a specification.

My invention consists in an improvement in vehicle tires, more especially tires for the wheels of automobiles or the like. It has for its object to provide a resilient tire avoiding the necessity of pneumatic cushioning or inner tubing, and relying upon the resiliency of thin spring plate mechanism in connection with an annular resilient tread.

Referring to the drawing showing one preferred form of the invention,

Figure 1 is a view in side elevation of a portion of a wheel made in accordance with my invention;

Fig. 2 is an enlarged cross sectional view indicated by the line II—II of Fig. 1;

Fig. 3 is a similar sectional view showing a modification; and

Fig. 4 is a further sectional detail view illustrating an additional modification;

Fig. 5 is a perspective detail view showing a further modification.

The invention is designed to be applied to the felly of an ordinary automobile or other wheel, in the same manner generally as the ordinary demountable pneumatic tire or shoe and its rim. For such purpose, the felly 2 of the wheel is provided with an annular bearing ring 3 of well known construction and removable clamps 4 and bolts 5, as will be readily understood.

The tire forming the subject matter of my invention is composed of a continuous annular strip of suitable resilient metal, as steel, having a middle continuous portion 6 and series of laterally extending side members 7—7 at opposite sides thereof. These side members, which are outwardly curved sufficiently to provide for compression of the tread under the load or the various shocks of traffic, are separated at intervals by slits, so that when disposed in the annular arrangement of the complete wheel, the several side sections 7 extend radially from the center of the wheel, leaving a corresponding series of diverging openings 8 at each side. The outer terminal portions of the side members 7 are connected with the tread or shoe 9, which may be of solid rubber or other suitable material, by any suitable means, as transverse connecting rivets or bolts 10, as clearly shown in Figs. 1 and 2.

In Fig. 3 I show the terminals of the side members reversed upon themselves, and bent backwardly and inwardly toward each opposite side, providing additional supporting terminals 11, whereby the tread member 9 is further supported in connection with the bolts or rivets 10, in which case a single rivet may be utilized for each pair of terminals.

I also show an annular ring 12 which may be fixedly connected with the middle portion 6 of the annular spring portion in any suitable manner, as by electric welding, riveting, or otherwise, such supplemental ring member 12 adding stability and strength to the device and reinforcing it at the point of its mounting upon the wheel felly.

In Fig. 4, a similar ring 12', similarly connected, is mounted on the inner annular middle portion of the spring ring, and either construction may be utilized, as preferred.

In Fig. 5, I show a further modification in which individual sections comprising the middle connecting base 6ª and the sides 7ª, 7ª, are separately secured to a continuous annular connecting band 12ª by riveting, welding, or otherwise. This form is of advantage in renewing broken or worn parts at one or more locations of the entire wheel, without the necessity of substituting an entirely new set.

It will be understood that the number, dimensions, and form of the divided side members 7 or of other features of the invention may be variously changed or modified by the skilled mechanic to suit varying conditions of load, or other incidents of use, but all such changes are to be considered as within the scope of the following claims.

What I claim is:

1. A resilient tire consisting of an annular base ring of resilient material having outwardly bowed oppositely located divided side members each terminating in a free tread-engaging portion and an annular tread portion embraced at intervals between said portions.

2. A resilient tire consisting of a continuous thin metallic base strip having radially divided outwardly bowed oppositely located side portions each having a free tread-engaging terminal and an intervening annular tread member mounted between and connected with said terminals.

3. A resilient tire consisting of a continuous thin metallic base strip having radially divided outwardly bowed oppositely located side portions provided at their free outer ends with inwardly extending supporting bracket members, and an outer annular tread member fixedly connected therewith.

4. A resilient tire consisting of an annular ring of resilient material having outwardly bowed oppositely located divided side members and an annular tread portion connected therewith, and a middle supplemental annular reinforcing strip member connected therewith.

In testimony whereof I hereunto affix my signature.

WILLIAM T. C. MORGAN.